Figure 1:
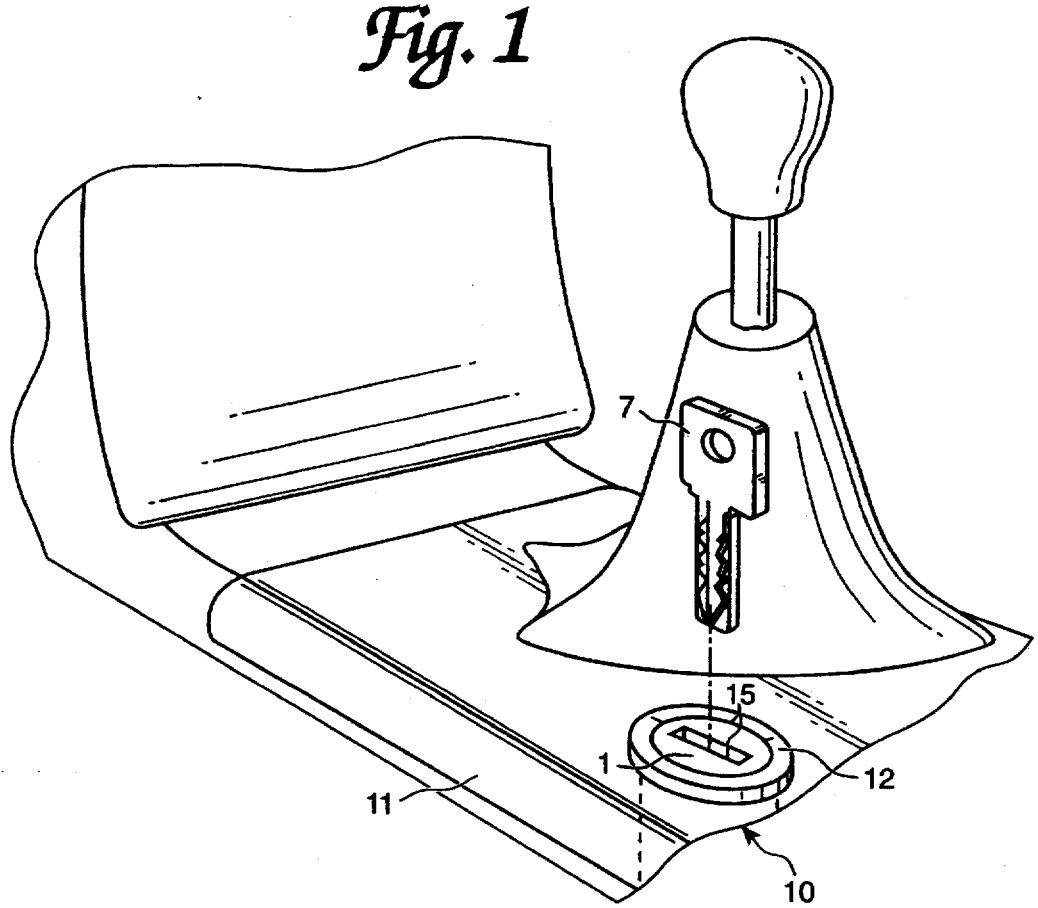

United States Patent [19]

Specht

[11] Patent Number: 5,682,777

[45] Date of Patent: Nov. 4, 1997

[54] ANTI-THEFT DEVICE FOR A MOTOR VEHICLE

[75] Inventor: Martin Specht, Feldafing, Germany

[73] Assignee: R. Schmidt GmbH, Lennestadt-Grevenbruck, Germany

[21] Appl. No.: 376,551

[22] Filed: Jan. 20, 1995

[30] Foreign Application Priority Data

Jan. 21, 1994 [DE] Germany ............ 44 01 715.4

[51] Int. Cl.⁶ ............................................. B60R 25/06
[52] U.S. Cl. ........................ 70/247; 70/276; 70/202
[58] Field of Search .......................... 70/245–248, 252, 70/253, 254, 276, 202, 223, 218

[56] References Cited

U.S. PATENT DOCUMENTS

| | | | |
|---|---|---|---|
| 3,680,335 | 8/1972 | Onishi | 70/252 |
| 3,919,869 | 11/1975 | Fromm | 70/276 |
| 4,250,976 | 2/1981 | Mochida | 70/252 |
| 4,307,589 | 12/1981 | Kajita | 70/276 |
| 4,837,567 | 6/1989 | Kleefeldt et al. | 70/252 |
| 4,848,115 | 7/1989 | Clarkson et al. | 70/276 |
| 5,431,244 | 7/1995 | Possobom | 70/247 |

FOREIGN PATENT DOCUMENTS

| | | | |
|---|---|---|---|
| 2503425 | 10/1982 | France | 70/254 |
| 2206715 | 8/1972 | Germany . | |
| 2708701 | 9/1978 | Germany . | |
| 2726737 | 12/1978 | Germany . | |
| 2948068 | 6/1981 | Germany . | |
| 3502430 | 7/1986 | Germany . | |
| 2160485 | 12/1985 | United Kingdom | 70/248 |

*Primary Examiner*—Darnell M. Boucher
*Attorney, Agent, or Firm*—Keck, Mahin & Cate

[57] ABSTRACT

The invention pertains to a device for blocking the operation of a motor vehicle comprising a mechanical lock 5, by means of which the shifting operation of the transmission in the motor vehicle may be blocked, an actuating device 6 that is controlled by electrical signals and actuates the mechanical lock 5, and a coded transponder 7, by means of which the electrical signals that control the actuating device 6 are triggered once the code has been identified.

14 Claims, 5 Drawing Sheets

R bzw. P

ANTI-THEFT DEVICE FOR A MOTOR VEHICLE

The invention pertains to a device for blocking the operation of a motor vehicle. Conventional devices of this type block the steering wheel such that one function that is relevant for operating the motor vehicle is blocked by mechanical means. However, electronic blocking devices also exist. Conventional systems of this type may be bypassed by relatively simple manipulations, so that only an inferior protection against theft is insured. In particular, with electronic blocking devices, there exists the additional risk that these blocking devices may be triggered during the operation of the motor vehicle, i.e., the motor vehicle is rendered inoperable.

The invention is based on the objective of creating a device for blocking the operation of a motor vehicle that increases the protection against theft.

According to the invention, this objective is attained with the characteristics disclosed in the claims.

According to these characteristics, the invention creates a device for blocking the operation of a motor vehicle that represents a combination of mechanical and electronic safety means. A mechanical lock, by means of which the shifting operation of the transmission in the motor vehicle is locked or blocked, cooperates with an actuating device that is controlled by electrical signals. However, it is only possible to control the actuating device once the code of a transponder has been identified. The signals required for controlling the actuating device are only triggered once the code has been identified. The invention realizes a blocking device that is actuated automatically.

The actuating device that is controlled by the electrical signals comprises a coupling device, e.g., in the form of a lifting magnet, that is actuated by said electrical signals as well as an actuating part that is moved by external influences, e.g., manually, and coupled with the mechanical lock via the coupling device in order to transmit the motion. The motion of the actuating part may be used by the coupled lock for moving the mechanical lock into its blocking position in which the shifting operation of the transmission in the motor vehicle is blocked such that no additional shifting of the gears may be carried out. If the motor vehicle is equipped with a manual transmission, the gear shift lever is preferably locked in the reverse gear, and if the motor vehicle is equipped with an automatic transmission, the gear shift lever is preferably locked in the park position (P position). In addition, the motion transmitted from the actuating part to the mechanical lock may be used for disengaging this blocking arrangement.

If the mechanical lock is situated in its blocking position, it is decoupled from the actuating part such that external manipulations of the internally arranged mechanical lock are no longer possible. The mechanical lock is preferably connected with the body of the motor vehicle in a nonpositive fashion if it is situated in its blocking position, so that an external disengagement of the blocking arrangement via the decoupled actuating part is impossible. Also, the blocking device may not be bypassed by electronic manipulations because the coupling between the actuating part and the mechanical lock may only be controlled once the correct code has been identified.

According to one preferred embodiment of the invention, the actuation of the blocking device is combined with the ignition lock of the motor vehicle. In this case, the ignition lock is preferably arranged in the vicinity of the gear shift lever of the transmission in the motor vehicle such that the mechanical lock may block an element of the gear shift lever that transmits the shifting motion to the transmission. For this purpose, the mechanical lock is situated in the interior of the gear shift lever housing, so that external manipulations of the mechanical lock are not possible without a correspondingly coded ignition key (transponder).

The closing cylinder of the ignition lock acts as the actuating part and as a guidance for the coded ignition key (transponder). Once the code has been identified by the identification device arranged in the actuating part (closing cylinder), the mechanical lock is coupled with the closing cylinder, so that the turning of the closing cylinder may be used for moving the mechanical lock into its blocking position or its disengaged position.

Figures 1, 2A:
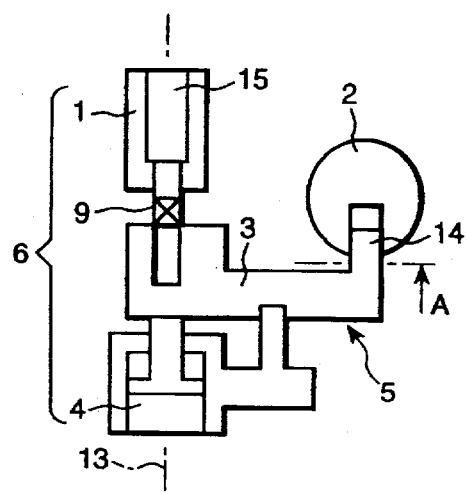
Figures 2, 2A:
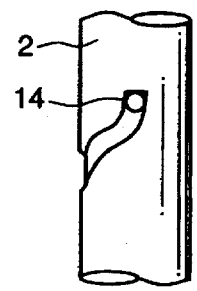

One embodiment of the invention is described in detail below with reference to the figures. The figures show:

FIG. 1: a perspective representation of the arrangement of one embodiment of the blocking device in a motor vehicle;

FIG. 2: different operating positions of the embodiment of (A–E) the blocking device when starting the motor vehicle; and FIG. 3: different operating positions of the embodiment of (A–E) the blocking device when parking the motor vehicle.

FIG. 1 shows one embodiment of a blocking device 10 that may be arranged in the shifting console of a motor vehicle. The embodiment of the blocking device 10 illustrated in this figure is combined with an ignition lock 12 of the motor vehicle that is also arranged in the shifting console 11 as described in detail below with reference to the figures.

This embodiment of the blocking device is equipped with a mechanical lock 5. This mechanical lock 5 essentially comprises a locking lever 3 that may be turned about an axis 13 that is identical to the axis of the ignition lock. The front end of the locking lever 3 is provided with a contact part 14 that may be engaged with the shifting lever 2 of the transmission. The gear shift lever 2 transmits the shifting motion to the transmission in the motor vehicle. In FIGS. 2(A), (D), and (E) as well as in FIGS. 3(A), (B), and (E), the gear shift lever is illustrated in the form of a sectional representation in the left illustration and in the form of an elevational view in the right illustration.

An actuating device 6 cooperates with the mechanical lock 5. In the embodiment shown, the actuating device 6 comprises an actuating part 1 that may be designed as the closing cylinder of the ignition lock 12. In addition, the actuating device 6 comprises a coupling 9, by means of which the actuating part 1 and the mechanical lock 5 may be coupled with one another. The actuating device 6 additionally comprises a lifting magnet 4 for engaging and disengaging the coupling 9.

The lifting magnet 4 is supplied with power in accordance with a code reading device 8. The code reading device 8 is arranged in the actuating part 1. However, the code reading device may also be arranged at any other location in order to identify the code of a transponder 7 that was inserted into an insertion slot 15 of the actuating part 1. In the embodiment shown, the transponder is designed as an ignition key. It is preferred if the transponder 7 is provided with an electronic code.

The function of the blocking device in association with the actuation of the ignition lock is described in detail below with reference to FIGS. 2 and 3.

The illustrations (A)–(E) of FIG. 2 show the different operating positions of the blocking device that is coupled with the ignition lock when starting the motor vehicle. In FIGS. 2(A1) and 2(A2), the contact part 14 of the mechanical lock 5 is engaged with the gear shift lever 2. In this blocking position of the mechanical lock 5, the gear shift lever 2 of the transmission in the motor vehicle is situated in the reverse gear if the motor vehicle is equipped with a manual transmission or in the park position (P position) if the motor vehicle is equipped with an automatic transmission. In this position, the transmission in the motor vehicle or the gear shift lever for said transmission is blocked and may not be actuated. This figure also shows that the coupling 9 is disengaged from the locking lever 3 of the mechanical lock 5. This means that any external rotation applied to the actuating part 1 (closing cylinder) is not transmitted to the decoupled mechanical lock 5.

Figure 2B:
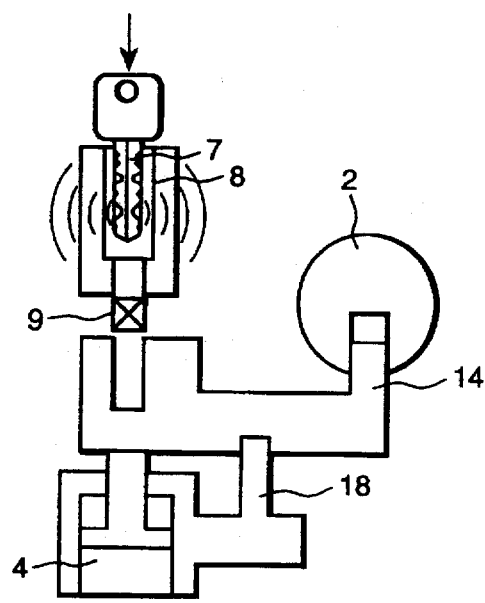
Figure 2C:
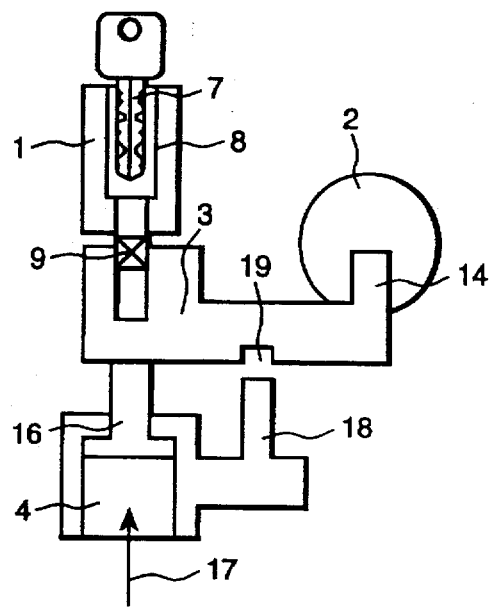

In order to disengage the mechanical lock 5 from the blocking position shown, a transponder 7 (ignition key) provided with a code is inserted into the insertion slot 15 of the actuating part 1 as shown in FIG. 2(B). A code reading device 8 is provided in the actuating part 1. Once this code reading device has identified the code of the ignition key as being correct, the electromagnet 4 is connected with a power source (not illustrated in detail). The rotor 16 of the lifting magnet 4 is moved in the direction of arrow 17 (lifting direction), with this motion being transmitted to the mechanical lock 5. This process is illustrated in FIG. 2(C). The locking lever 3 of the mechanical lock is moved out of the blocking position in the direction of arrow 17. During this process, the mechanical lock 5 is, if situated in its blocking position, disengaged from a positive and nonpositive connection that is produced between the mechanical lock and the body of the motor vehicle by means of correspondingly shaped contact elements 18 and 19. Reference numeral 18 identifies a projection that is connected with the body of the motor vehicle, and 19 identifies a correspondingly shaped recess on the locking lever 3. In addition, the coupling 9 between the actuating part 1 and the locking lever 3 is engaged during this motion. The actuating part 1 and the locking lever 3 are connected with one another so as to be moved collectively. In this particular operating position, the closing cylinder (actuating part 1) and the locking lever of the mechanical lock 5 are connected with one another such that they rotate collectively. Since the two contact elements 18 and 19 are arranged at a distance from one another, the locking lever 3 may be freely turned about the common axis 13 when turning the closing cylinder (actuating part 1).

Figures 1, 2D:
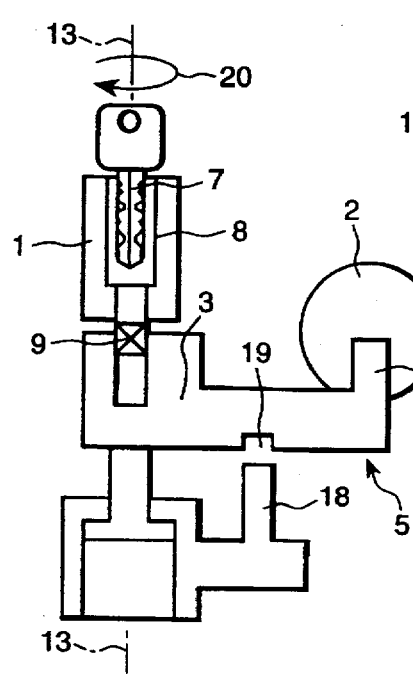
Figures 2, 2D:
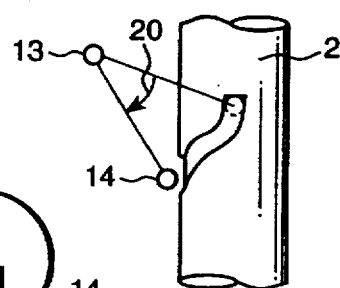
Figures 1, 2E:
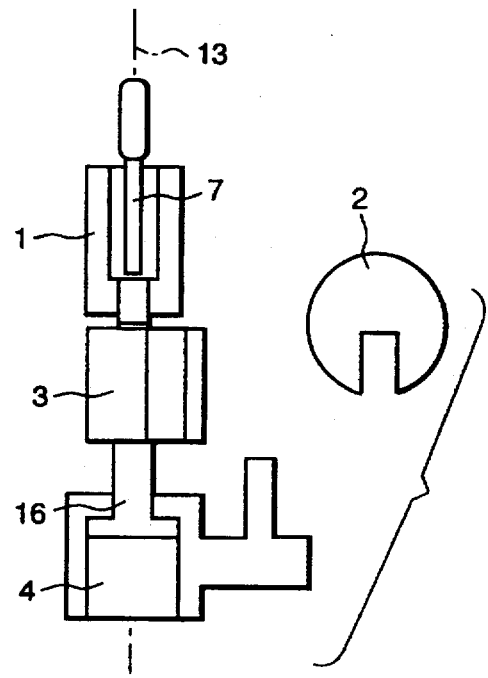
Figures 2, 2E:
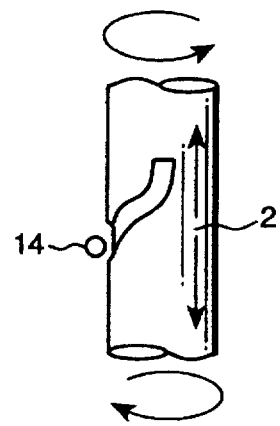
Figures 1, 3A:
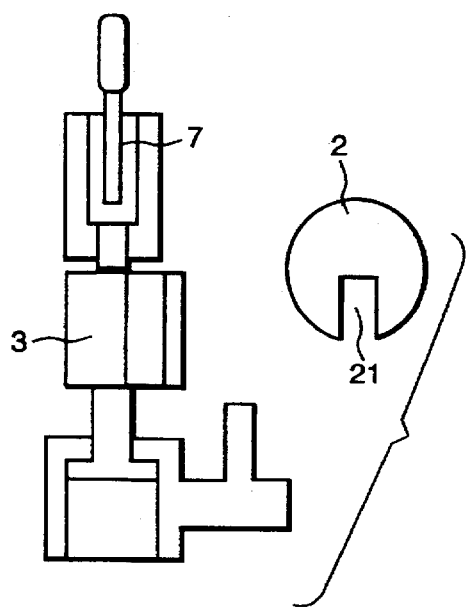
Figures 2, 3A:
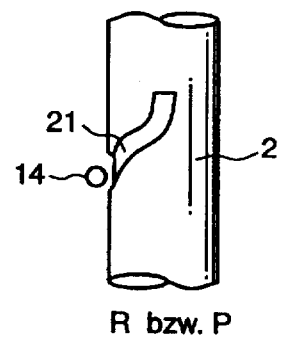
Figures 1, 3B:
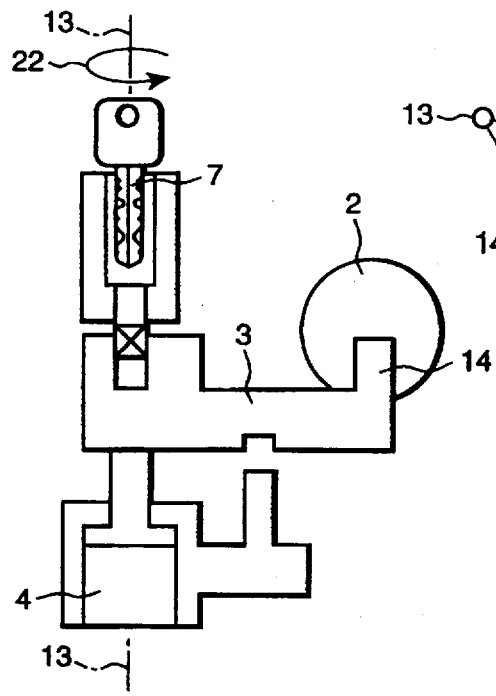
Figures 2, 3B:
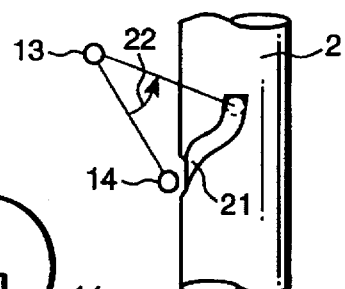
Figure 3C:
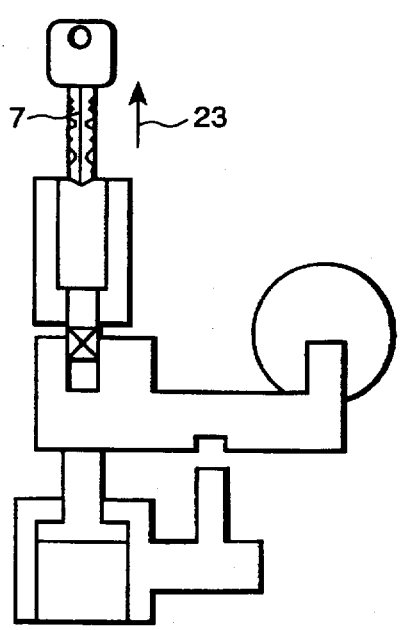
Figure 3D:
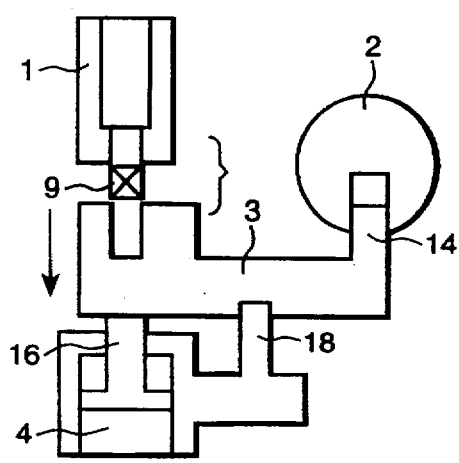
Figures 1, 3E:
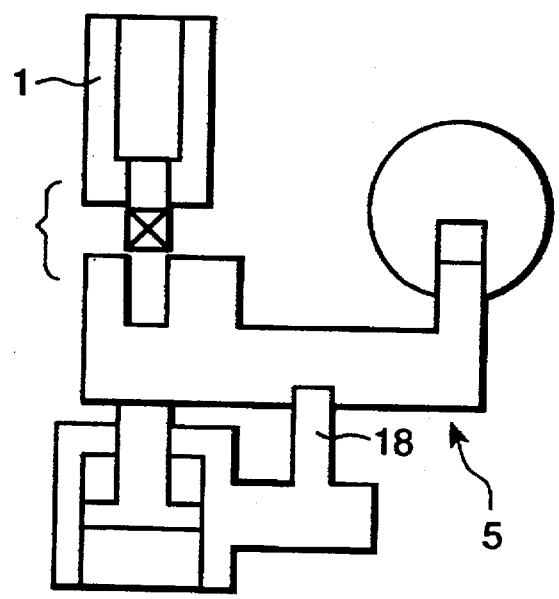
Figures 2, 3E:
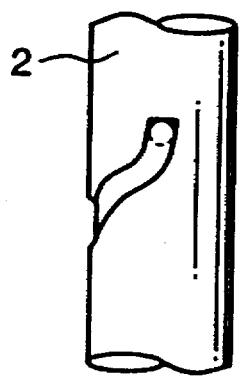

This process is illustrated in FIGS. 2(D1) and 2(D2). When turning the ignition key (transponder 7) to the starting position, namely in the direction of arrow 20 in FIG. 2(D), the contact part 14 is disengaged from the gear shift lever 2. This means that the gear shift lever is unlocked and the manual transmission or the automatic transmission may be freely actuated in order to move the gear shift lever into the proper position for starting the motor and operating the motor vehicle.

In FIGS. 2(E1) and 2(E2), the possibility for arbitrarily selecting the appropriate gears is schematically illustrated by arrows that characterize the rotating and moving directions of the gear shift lever 2. It is now possible to start the motor vehicle, e.g., by additionally turning the ignition key (transponder 7) and consequently the actuating part 1 (closing cylinder). The coupled locking lever 3 is also turned correspondingly during this process.

FIGS. 2(E1) and 2(E2) also shows that the rotor 16 of the lifting magnet 4 remains attracted as long as the transponder 7 (ignition key) is inserted into the actuating part 1 (closing cylinder) and corresponds with the code reading device 8.

This means that the closing cylinder of the ignition lock remains coupled with the locking lever 3 of the mechanical lock 5 during normal driving operation. This connection between the closing cylinder (actuating part 1) and the locking lever 3, which is produced via the coupling 9, makes it possible to insure that, after turning the ignition off, the closing cylinder (actuating part 1) may only be moved into the proper position for removing the ignition key (transponder 7) if the gear shift lever 2 is situated in the reverse gear or the park position. This operating position is illustrated in FIGS. 3(A1) and 3(A2), whereby "R" characterizes the case of a manual transmission and "P" characterizes the case of an automatic transmission. FIGS. 3(A1), 3(A2), 3(B1) and 3(B2) show that a contact opening 21 provided on the gear shift lever 2 is aligned with the contact part 14 on the locking lever 3 in this instance. The ignition key may be turned to its end position (position 0) in the direction of arrow 22, with the contact part 14 engaging with the contact slot 21 in the gear shift lever 2. This process is shown in illustration (B) of FIG. 3.

The ignition key (transponder 7) may be removed in the end position (position 0) of the closing cylinder (actuating part 1). This process is indicated by arrow 23 in FIG. 3(C).

After removing the ignition key (transponder 7) from the closing cylinder (actuating part 1), the power supply for the electromagnet 4 is interrupted. This interruption of the power supply preferably takes place with a certain time delay. The rotor 16 of the electromagnet is released as soon as the power supply is interrupted. Consequently, the coupling 9 between the actuating part 1 (closing cylinder) and the locking lever 3 of the mechanical lock 5 is disengaged. The locking lever 3 of the mechanical lock remains in the position in which it is engaged with the gear shift lever 2 and additionally engages with the contact part 18 that is rigidly connected with the body of the motor vehicle. The motion illustrated in FIG. 3(D) then causes the final blocking position of the mechanical lock 5, which is illustrated in FIGS. 3(E1) and 3(E2) and corresponds with the operating position illustrated in FIGS. 2(A1) and 2(A2). In this blocking position, the gear shift lever 2 may be blocked on a part of the body of the motor vehicle via the mechanical lock 5 and the contact part 18. The actuating part 1 (closing cylinder) and the locking lever 3 of the mechanical lock are disengaged, so that the mechanical lock 5 may not be manipulated via the closing cylinder of the ignition lock. The blocking device is situated in its activated position. The combination between mechanically and electronically actuated safety components increases the protection against theft. The cost of the device according to the invention is low due to the modular design. In addition, an ignition lock in the steering column, i.e., a region that is associated with the risk of injuries (knee impact), is no longer necessary. The blocking device may be actuated by means of a combination between a coded, in particular, electronically coded, ignition key (transponder) and an ignition lock.

I claim:

1. A device for blocking the operation of a motor vehicle comprising:

a mechanical lock (5) movable between a blocking position engaging a shifting device (2) of a transmission in the motor vehicle for blocking a shifting operation and a unblocking position in which the lock is disengaged from the shifting device (2) for allowing a shifting operation, an actuating means for moving the mechanical lock (5), said actuating means comprising a coupling device (9), an actuating part (1) and a lifting magnet (4), a coded transponder (7), and a reading device (8) for reading a code of the transponder (7), the lifting magnet (4) is controlled by electrical signals and moves the mechanical lock (5) between a first position and a second position, the actuating part (1) adapted to be movable by external influence is coupled to the mechanical lock (5) by the coupling device (9) when the lifting magnet moves the lock into the first position and the actuating part is decoupled from the mechanical lock when the lifting magnet moves the lock into the second position, wherein the electrical signals controlling the lifting magnet (4) are triggered after the code of the transponder (7) has been identified by the reading device (8).

2. Device for blocking the operation of a motor vehicle according to claim 1, wherein the mechanical lock (5) is decoupled from the actuating part (1) when said mechanical lock is situated in the blocking position.

3. Device for blocking the operation of a motor vehicle according to claim 1, wherein the transponder (7) inserted into the actuating part (1) to trigger the electrical signals that control the actuating device (6), and the mechanical lock (5) is mechanically connected with the actuating part (1) via the actuating device (6) to carry out an additional actuation.

4. Device for blocking the operation of a motor vehicle according to claim 1, wherein the actuating part (1) is provided with the reading device (8) for identifying the code of the transponder (7).

5. Device for blocking the operation of a motor vehicle according to claim 1, wherein the actuating part (1) is movable, and motion of the actuating part is transmitted onto the mechanical lock (5) when in the first position.

6. Device for blocking the operation of a motor vehicle according to claim 1, wherein the actuating part is moved manually by the transponder (7) which is inserted in the actuating part (1), and motion resulting therefrom is transmitted to the lock when in the first position (5).

7. Device for blocking the operation of a motor vehicle according to claim 1, wherein the actuating part (1) is rotatable.

8. Device for blocking the operation of a motor vehicle according to claim 1, wherein the mechanical lock (5) is rigidly connected to a body of the motor vehicle when said mechanical lock is situated in the blocking position.

9. Device for blocking the operation of a motor vehicle according to claim 1, wherein the transponder (7) is coded electronically.

10. Device for blocking the operation of a motor vehicle according to claim 1, wherein the transponder (7) is an ignition key, and that the actuating part (1) is an ignition lock.

11. Device for blocking the operation of a motor vehicle according to claim 1, wherein a transmission in the motor vehicle, which is designed as a manual transmission, is capable of being locked in the reverse gear via the mechanical lock (5).

12. Device for blocking the operation of a motor vehicle according to claim 1, wherein an automatic transmission in the motor vehicle is locked in park position via the mechanical lock (5).

13. Device for blocking the operation of a motor vehicle according to claim 10, wherein the ignition key is only removable from the actuating part if a gear shift lever of a manual transmission is shifted into reverse gear or a gear shift lever of an automatic transmission is shifted into park position.

14. Device for blocking the operation of a motor vehicle according to claim 10, wherein a closing cylinder of an ignition lock is only able to be turned to the position in which it releases the ignition key when a gear shift lever of a manual transmission is shifted into reverse gear or a gear shift lever of an automatic transmission is shifted into park position.

* * * * *